United States Patent Office 3,364,911
Patented Jan. 23, 1968

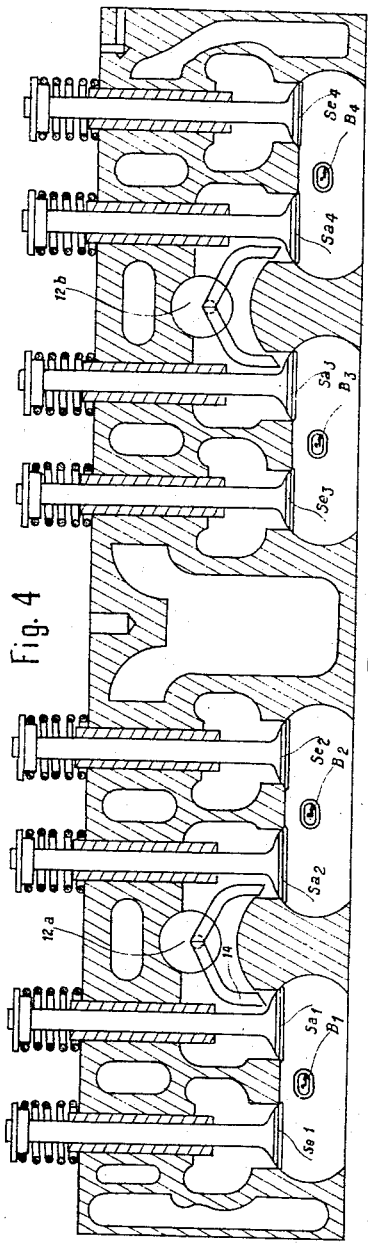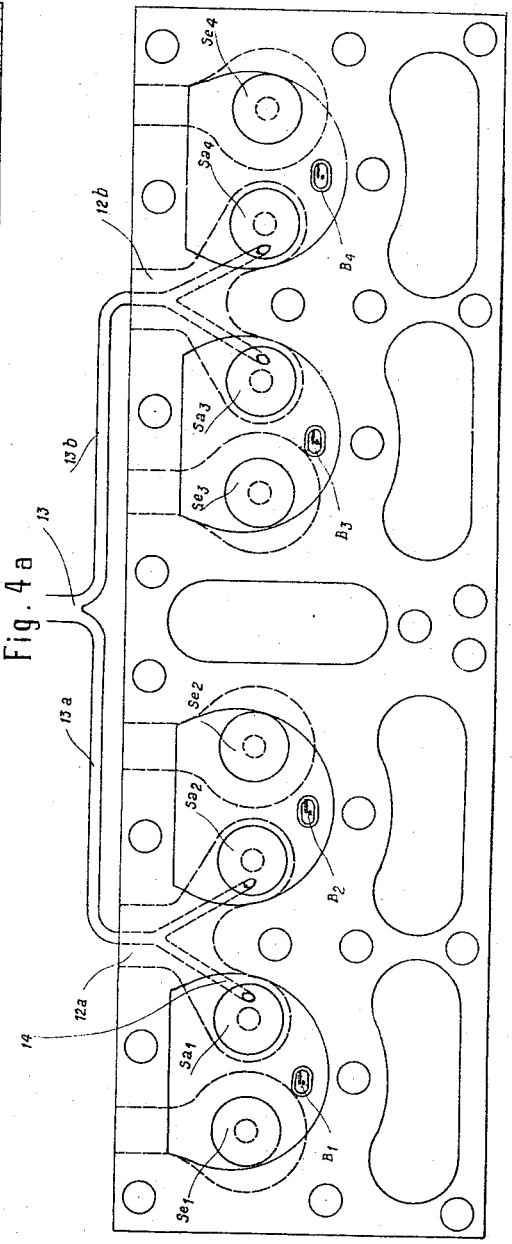
Fig. 4
Fig. 4a

3,364,911
INTERNAL COMBUSTION ENGINE USING
LEAN MIXTURES
Jean Baudry and Jean Chopin, Rueil-Malmaison, France, assignors to Institut Francais du Petrole, des Carburants et Lubrifiants, Rueil-Malmaison, France
Filed Mar. 28, 1966, Ser. No. 537,794
Claims priority, application France, Mar. 27, 1965, 10,999
7 Claims. (Cl. 123—127)

The present invention relates to improvements in controlled ignition engines allowing them to operate with heterogeneous carburated combustion mixtures which are lean on an average i.e., carburated mixtures in which the amount of fuel is less than in a stoichiometric mixture which corresponds, when air and gasoline are used, to about 15 gr. of air per gram of gasoline, these proportions varying somewhat with the nature of the fuel. The stoichiometric mixture has, as a matter of convention, a richness in fuel equal to unity.

The improvements of the present invention are applicable to existing controlled ignition engines and necessitate only minor changes in these engines.

The combustion of lean mixtures can be made more perfect than combustion of rich mixtures which burn only imperfectly. The use of lean mixtures can provide numerous advantages as compared to the use of rich mixtures and, in particular:

(1) Economy of fuel.
(2) A reduction in the amount of noxious unburned components in the exhaust gas.
(3) Reduction of deposits of calamine in the engine, these deposits resulting primarily from poor combustion.

In controlled ignition engines, the essential difficulty is that it is impossible to ignite, under good conditions, homogeneous fuel mixtures in which the richness of fuel is less than a limiting value of the order of 0.85.

Numerous solutions have been proposed to overcome this difficulty and the principal ones of these solutions are:

(1) Separation of the combustion space into two parts consisting, for example, of two separate combustion chambers in communication with each other, one of them forming a pre-chamber. Alternatively these two parts can be constituted by separating a single combustion chamber into two separate zones, for example, by a wall.

In this solution, the combustion zone comprises two chambers hereinafter called the principal chamber and the secondary chamber. The secondary chamber is fed with a mixture having a richness greater than the total richness, that is, the average richness of the gas in the entire combustion space formed by the two chambers while the principal chamber is fed only with a lean mixture, or even with air. The secondary chamber has a spark plug.

Feed to each of the parts of the combustion space can be carried out separately by means of separate admission apparatus such as valves or injectors, or by means of a single valve utilizing deflection means to separate the flows of different richness.

By this process, correct combustion can be obtained from a lean feed in the combustion space by maintaining the richer mixture in the secondary chamber with the energy developed in the secondary chamber upon combustion causing the combustion of the rest of the charge in the principal chamber.

This solution, while permitting the effective use of lean mixtures in controlled ignition engines, has major inconveniences because of which this solution has never had commercial acceptance.

These inconveniences, resulting from the separation of the combustion space into a secondary chamber fed with a rich mixture and a principal chamber fed with a lean mixture or air, are:

(a) A decrease in power resulting from the fact that the ratio of the total surface of the combustion space (surface of the secondary chamber and surface of the principal chamber) to the total volume of this space is greater than the corresponding ratio in the absence of separation of the two parts of the combustion space when the secondary chamber has substantial dimensions as compared to those of the principal chamber.

(b) Loss of utilizable energy resulting from the movement of a volume of combustion gas from the secondary chamber to the principal chamber.

(2) Another proposed solution consists of feeding a combustion chamber having no physical separation with a lean mixture and injecting toward the spark plug during the compression cycle, and preferably just before ignition, a fraction of a mixture richer in fuel which, while not appreciably increasing the total richness of the feed, increases the local richness of the mixture in the neighborhood of the spark plug for proper ignition which then causes combustion of the rest of the lean mixture.

However, this injection of rich mixture should occur slightly before ignition in order to avoid the possibility of dilution thereof by the lean mixture, before the instant of ignition, which dilution would make ignition impossible.

This last solution does not have the several inconveniences discussed above but necessitates for use with known controlled ignition motors new supplementary injection apparatus under high pressure which are complex and costly and which further use a part of the energy produced by the engine.

A more interesting solution has been proposed which comprises admitting into a combustion chamber having no physical separation two flows of different richness in fuel (the lean flow can be air) by two ducts simultaneously opened by the same valve during the intake cycle. In this process, the duct for the admission of the richer mixture ends in a nozzle causing a directional flow of the mixture directed toward the electrodes of the spark plug, this directional flow having a relatively high richness (preferably greater than 5) to permit operation of the engine with a fuel mixture which is lean on the overage.

This solution, as in the other two solutions, provides at the moment of ignition in the combustion chamber and in spite of the absence of any physical separation in the combustion chamber a stratified heterogeneous fuel charge poor in fuel but presenting in the neighborhood of the spark plug a zone of sufficient richness which, upon combustion, causes combustion of the leaner mixture.

The present invention provides a solution for this problem which is more simple than that resulting from the process last discussed above and has none of the inconveniences of the other solutions.

The present invention is used with controlled ignition internal combustion engines comprising at least one cylinder which includes a combustion space comprising only a single chamber.

The present invention is not concerned with engines in which the combustion space is divided by physical separation means into two parts, that is, a primary chamber or pre-chamber and a principal chamber and therefore requires no change in the cylinders of known engines to which it is adaptable.

An engine utilizing the present invention comprises an intake port, an intake valve successively opening and closing the intake port, a first intake pipe opening into the combustion space through the intake port, a second intake pipe including an end pipe, the intake valve being adapted when open during the intake cycle to place the combustion space substantially simultaneously in communication with the first pipe and with the second pipe through the terminal pipe of the second pipe.

In accordance with the present invention, it has been established by experimentation that it is possible to feed an air fuel mixture to the first pipe having a richness between 0.75 and 1.70 and to feed the second pipe with air having a richness of fuel therein between 0 and 0.75 to obtain correct combustion with an average richness in the combustion chamber less than the minimum richness which could be used when the combustion chamber is fed in conventional manner with a single fuel flow.

However, for an appreciable decrease in a minimum average richness to be obtained, it has been established that it is necessary to combine with the separate feeds to the combustion space of the lean flow and of the richer flow, as described above, an orientation of the terminal pipe introducing the lean mixture into a part of the combustion space sufficiently distant from the electrodes of the spark plug and a limitation in the cross-section of the end of the terminal pipe with respect to the cross-section of the intake port.

In particular, tests have shown that the section of the end of the terminal pipe should not be greater than one-third of the section of the intake port so that an appreciable decrease in the minimum average richness can be obtained. The best results have been obtained with a ratio of these sections less than 1/5 and, in particular, in the neighborhood of 1/10.

Further, the part of the combustion space toward which the terminal pipe for admitting the lean mixture should be directed is that space exterior of a sphere centered at the ignition point of the spark plug and passing through the center of the intake port.

Under these conditions, it is also necessary to provide means for separate control of the respective amounts of the two feed flows supplying the combustion chamber to assure correct functioning of the engine during the diverse conditions of use of the engine.

It appears that these results can be explained by the fact that, in giving the terminal pipe providing the feed of lean mixture or non-carburated air a section sufficiently small with respect to the intake port of the rich mixture, a speed of admission of the lean mixture is obtained, which is substantially greater than that of the rich mixture, which in combination with the orientation given to the terminal pipe to direct the lean mixture into a zone of the combustion space distant from the electrodes of the spark plug, provides local richness in the neighborhood of the spark plug higher than the average richness at the moment of ignition in spite of the absence of a physical separation in the combustion chamber.

The relative speed given to the lean mixture with respect to the rich mixture, together with the relative dimensions of the intake pipes within the scope of the present invention, increases the turbulence of the fuel mixture in a zone of the combustion space which is sufficiently distant from the electrodes of the spark plug so that this increased turbulence is not prejudicial to efficient ignition and provides an increase in the speed of combustion.

The lean mixture, having a richness between 0 and 0.75 and feeding the combustion chamber, preferably is air without fuel having a richness of 0 for reasons of simplicity without the invention being limited to this preferred embodiment.

The relative dimension of the intake orifice of the lean mixture or non-carburated air, in combination with its orientation toward the part of the combustion space outside of the sphere centered between the electrodes of the spark plug and passing through the center of the intake port has the advantage of simultaneously providing in the combustion charber a heterogeneous mixture and an increase in the turbulence of the carburated mixture.

The combination of these two effects compared to classical feeding procedures using a single carburated flow, provides a decrease in the minimum average richness for proper functioning and, for a predetermined richness, provides an increase in the speed of combustion which increase, in particular at partial load, results in a decrease in the value of the optimum advance of ignition and in an increase in power.

One of the essential advantages of the present invention is found in the fact that the feed of the lean mixture and of the richer mixture takes place from tubes which are simultaneously placed in communication with the combustion chamber by the opening of the same valve. In practice, the tube for the feed of the richer mixture can be the normal intake port of the engine and located within it a tube of reduced cross-section for the feed of the lean mixture, this last tube being oriented in such a way that the lean mixture cannot flow into the neighborhood of the spark plug.

Illustrative embodiments of the present concept are shown in the accompanying drawings but these should in no way be construed as defining or limiting the invention.

In the accompanying drawings:

FIGS. 4 and 4a show an embodiment of the present concept as applied to a four-cylinder engine utilizing apparatus as shown in FIGS. 1 and 1a;

In the drawings like reference characters indicate like parts.

Figure 1:
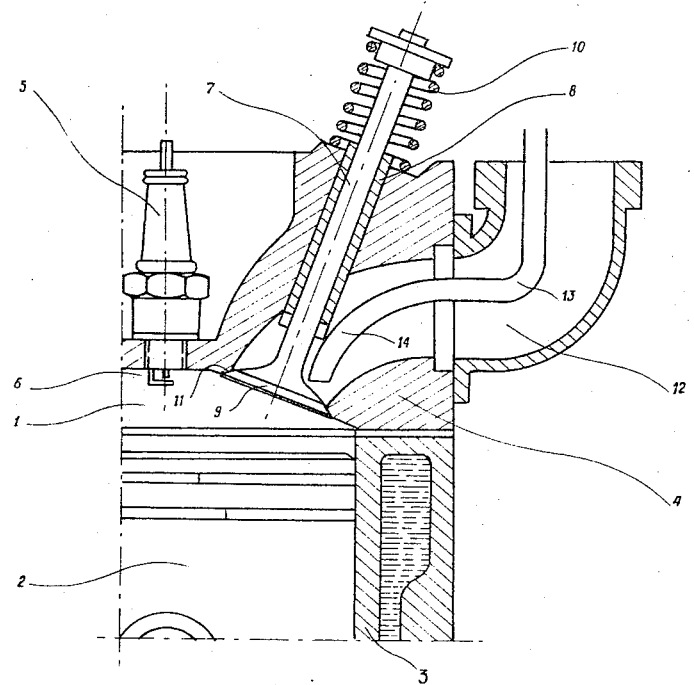
FIGS. 1 and 1a show an embodiment of the present concept with the intake valve being, respectively, in closed position and in open position.

The apparatus of FIG. 1 is extremely simple and is easily used for a combustion chamber of known type controlled ignition internal combustion engines.

Such a combustion chamber is shown partially at 1 in FIG. 1 in cross-sectional view in a plane passing through the axis of the spark plug and through the axis of the intake valve. This chamber is formed between piston 2, which reciprocates in cylinder 3, and cylinder head 4.

The spark plug is shown at 5, and 6 designates the electrodes of the spark plug.

The intake valve includes a stem 7 sliding in valve guide 8 and has a valve head 9 which, in closed position (FIG. 1), fits tightly against valve seat 11 under the action of spring 10, seat 11 being formed around intake port 47 (FIG. 1a) through which intake pipe 12 opens into chamber 1.

The opening and closing of the inlet valve are controlled by known means which are not shown.

The exhaust valve for chamber 1 is of the usual type and has not been shown. This valve may occupy, for example, a position symmetrical with that of the intake valve with respect to a plane perpendicular to that of the figure and passing through the axis of the spark plug.

The engine includes a second intake pipe 13 located within pipe 12 and communicating with a terminal pipe 14. The extremity of terminal tube 14, which opens adjacent to valve head 9 on the internal face thereof, if so disposed that while a first gas flow is admitted into chamber 1 when the valve is opened (FIG. 1a) and a second gas flow is admitted through pipe 13, a part at least of the first flow into the combustion chamber (solid arrows in FIG. 1a) flows between the electorodes 6 and the second gas flow (broken arrows in FIG. 1a).

Further, end pipe 14 is oriented in such a way that the direction of admission into chamber 1 of the second gas flow through this terminal pipe tends to separate it from the first flow reaching the electrodes 6.

Figure 1A:
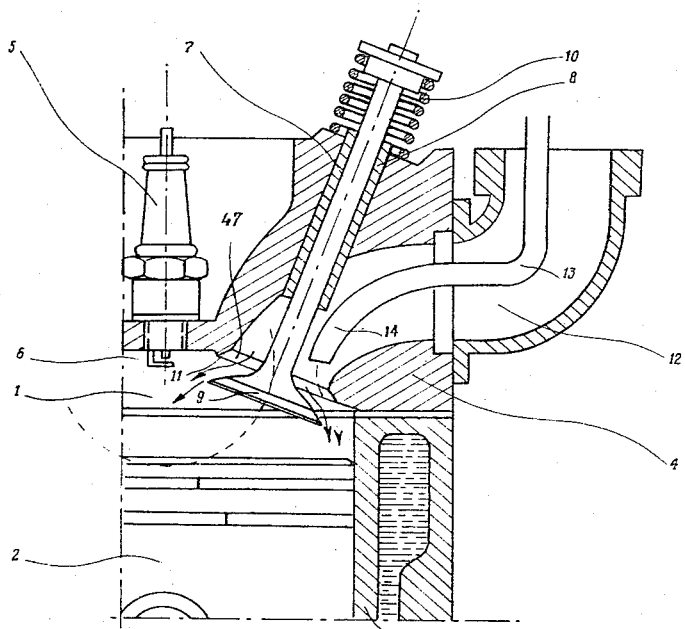

More precisely, pipe 14 is oriented toward the part of the combustion space outside of a sphere centered at the ignition point of the spark plug between the electrodes and substantially passing through the center of the intake port on which valve head 9 is seated (an outline of this sphere is traced in broken line in FIG. 1a).

Further in accordance with the invention, the orifice through which terminal pipe 14 opens into the combustion chamber has a cross-section $s$ less than one-third of the cross-section $S$ of the intake port (FIG. 1) and preferably less than $S/5$. Section $s$ could be, in particular, in the neighborhood of $S/10$. Tests have shown that if these conditions are met, the engine can function correctly with an average richness in the combustion chamber appreciably less than if this combustion chamber was fed in known manner with a homogeneous single flow under the same conditions of use.

This results in a decrease in consumption of fuel and a decrease in noxious unburned elements of the exhaust gas.

Pipes 12 and 13 are fed by air-fuel mixtures having a richness in fuel, respectively, of between 0.75 and 1.7 (the richest mixture) for pipe 12 and between 0.75 and 0 (lean mixture of air) for pipe 13.

These two mixtures will be admitted simultaneously into chamber 1 during the intake cycle with the intake valve being opened (FIG. 1a). Separate control means for the amounts of the two mixtures, including, for example, butterfly valves, are associated respectively with the pipes 12 and 13.

The amounts of the richer mixture and of the lean mixture will be such that the average richness in fuel of the non-homogeneous gas mixture thus admitted into chamber 1 is at the most equal to 1.1 and preferably is between 0.5 and 1.1.

In a preferred form of the present invention, by reason of the simplicity of operation, the lean flow in pipe 13 will be air without fuel.

Figure 2:
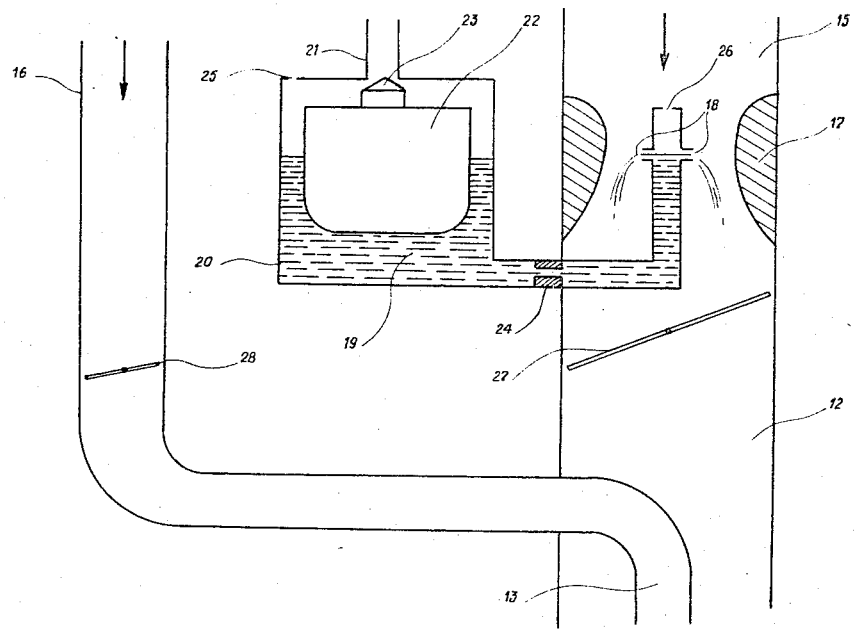
FIGS. 2 and 3 show schematically apparatus for obtaining the two gas mixtures utilized in the feed of a combustion chamber of a controlled ignition engine in accordance with the present invention.
Figure 3:
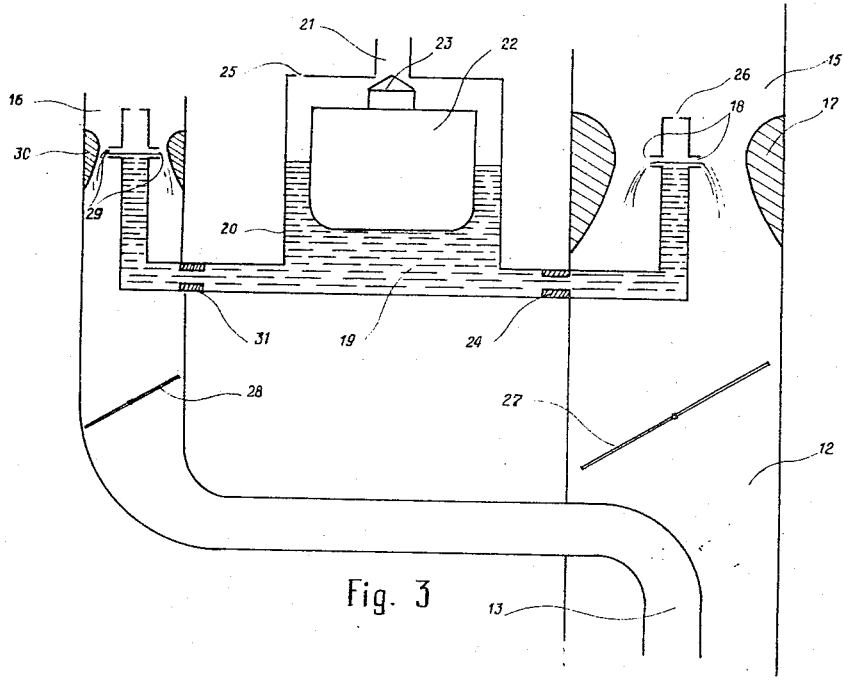

FIGS. 2 and 3 schematically illustrate apparatus for obtaining the two gas flows utilized in the present concept for feeding the combustion chamber of a controlled ignition motor by admission apparatus such as that of FIGS. 1 and 1a or of the type which will be described hereinafter with reference to FIG. 5.

These apparatuses use known types of carburetors.

The apparatus of FIG. 2 comprises two ducts 15 and 16 by which air is admitted which has passed through an air filter which is not shown and which is located upstream of the pipes 12 and 13.

Duct 15 is connected to pipe 12 of admission apparatus such as shown in FIGS. 1 and 1a for the admission of the richer mixture with duct 16 being extended by pipe 13 for the admission of the lean mixture.

A venturi 17 is mounted in duct 15 and in the throat of venturi 17 occurs the admission of the fuel (here gasoline) through orifices 18 in a carburetor 19 of known type comprising a float-chamber 20 in which the fuel is admitted through pipe 21 with its admission into chamber 20 being controlled by float 22 and float spindle 23.

The carburetor is provided with a nozzle 24. The carburetor is in communication with the atmosphere through opening 25 or through one of the ducts 15 or 16.

Orifice 26 above opening 18 opens into duct 15 or can be in direct communication with the atmosphere.

Control of the amount of air admitted by pipe 13 and of the amount of mixture of fuel and air admitted by pipe 12 is provided by control or butterfly valves 28 and 27 respectively.

For a sufficient opening of butterfly valve 28, the amount of admission of lean mixture will be controlled by the minimum section downstream of this butterfly valve.

The opening of the butterfly valves can be synchronized, for example, by known systems of levers in such a way that the openings uncovered by valves 27 and 28 will remain in a substantially constant ratio and variations in the load are met by modifying the openings of these valves and by control of the richness of the mixture in pipe 12 by known means.

In this way the ratio of the amounts of flow will remain substantially constant for small openings of the valves.

Figure 6A:
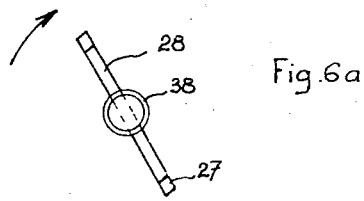
FIG. 6a is an end view of the apparatus of FIG. 6.
Figure 6:
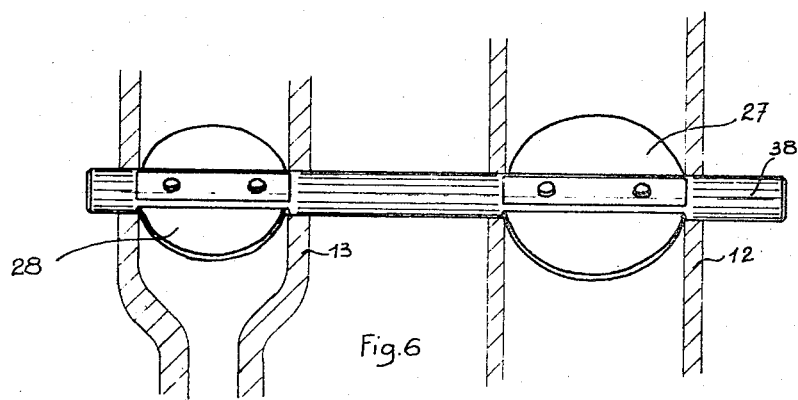
FIG. 6 illustrates the use of butterfly valves for control of the two gas flows, which valves, mounted on a common axis are parallel to each other.

Another apparatus for maintaining a constant ratio between the opening of the valves is shown in FIG. 6.

In FIG. 6 the two butterfly valves 27 and 28 are mounted parallel on the same axis 38 and, since the diameter of pipe 13 at butterfly valve 28 is larger than the diameter of the end pipe 14, the equivalent of full opening of the butterfly valve is obtained so long as the section of the passage that it controls remains larger than that of the terminal pipe.

FIG. 6a is an end view of the axis of the two butterfly valves.

Pipe 13 for the lean mixture or for air is extended downstream of butterfly valve 28 by an extension having smaller internal diameter leading to terminal pipe 14.

When pipe 13 is used to feed air without fuel and the apparatus of FIG. 6 is used to connect the butterfly valves, it is advantageous to have the section of pipe 12 at butterfly valve 27 greater than that of pipe 13 at butterfly valve 28.

In another embodiment, valve 28 could be maintained fully opened for large variations in power furnished by the engine at a determined speed, by obtaining these variations in power through valve 27 and by supplementary intermediate apparatus not shown for control of the richness of the mixture in pipe 12.

At reduced power, apparatus could be used for closing valve 28 in accordance with a predetermined law. The position of valve 28 could also be controlled as a function of the depression found in one or the other of ducts 12 and 13 or of the depression in the throat of venturi 17.

Figure 7:
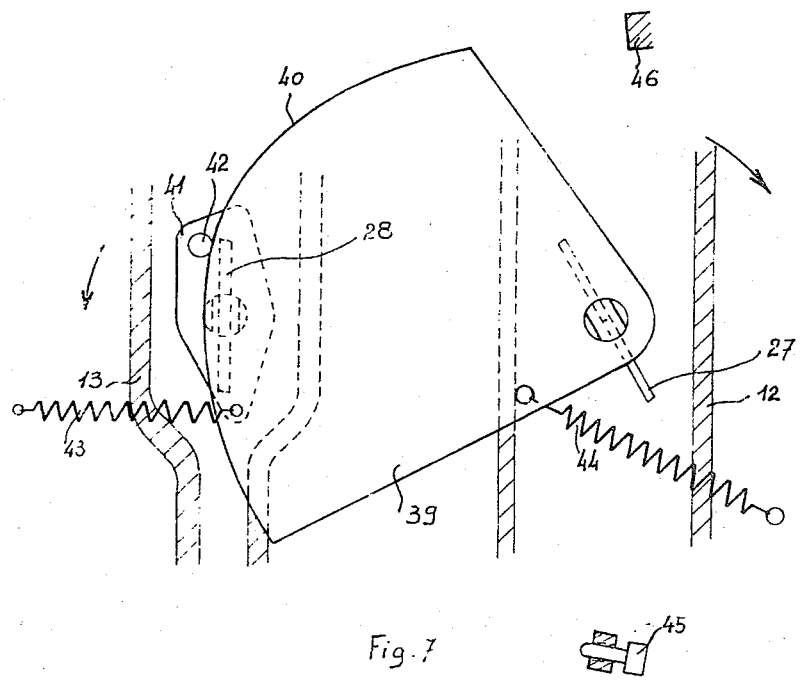
FIG. 7 illustrates apparatus utilizing a cam to control the relationship between the closings of the two butterfly valves.

FIG. 7 illustrates apparatus utilizing a cam 39 for controlling the movements of the two butterfly valves such that butterfly valve 28, in the leaning mixture pipe, will be wide open even before valve 27 reaches its fully opened position.

Cam 39 and butterfly valve 27 are simultaneously rotated around the same axis by the accelerator.

A lever 41 is fixed to the axis of butterfly valve 28 and rotates it through a stop or roller 42 carried by the lever and maintained in contact with cam 29 by spring 43 which urges valve 28 toward closed position.

A second spring 44 acts on cam 39 to urge valve 27 toward closed postion.

The profile 40 of the cam is chosen as a function of the ratios of the sections of the passage in the two pipes best adapted to the conditions of use.

Stops 45 and 46 limit rotation of the cam. Stop 45 should have a regulable position for control of the smaller amounts of flow in the two pipes which correspond to idling conditions.

The apparatus shown in FIG. 3 differs from that in FIG. 2 in that carburetor 19 also adds fuel to the air admitted by duct 16 by aspiration of fuel through opening 29 located in the throat of venturi 30.

A nozzle 31 is provided similar to nozzle 24.

It should be evident that the carburetors described are not limiting examples; that the known elements of their structure can be replaced by other elements equally well known to carry out the same functions; and that, for example, injectors could replace carburetor 19.

An application of apparatus as shown in FIGS. 1 and 1a to a four cylinder engine is illustrated in FIGS. 4 and 4a.

FIG. 4 is a cross-sectional view of such a motor in a plane containing the axes of the intake valves $Sa_1$, $Sa_2$, $Sa_3$, $Sa_4$, respectively, and the axes of the exhaust valves $Se_1$, $Se_2$, $Se_3$ and $Se_4$.

FIG. 4a is a view from below of the same motor.

The richer mixture provided by pipe 12 from apparatus such as shown in FIG. 2 or FIG. 3 is admitted into the cylinders by pipes 12a and 12b with pipe 12a opening into the cylinders at the left of the figure through ports whose openings are controlled by valves $Sa_1$ and $Sa_2$, respectively, while the pipe 12b opens into the two right cylinders through ports whose openings are controlled by valves $Sa_3$ and $Sa_4$.

The lean mixture, which can be air, is provided by pipe 13 having branches 13a and 13b feeding, respectively, the left group of cylinders and the right group of cylinders. Terminal pipe 14 of each of branches 13a and 13b extending each of the branches opens near the head of the corresponding intake valve such as $Sa_1$ on the outer portion of the combustion chamber this terminal pipe 14 having with respect to the spark plug an orientation similar to that shown in FIG. 1.

Control of the opening and closing of the intake and exhaust valves is provided in known way by known apparatus which is not shown.

Figure 5:
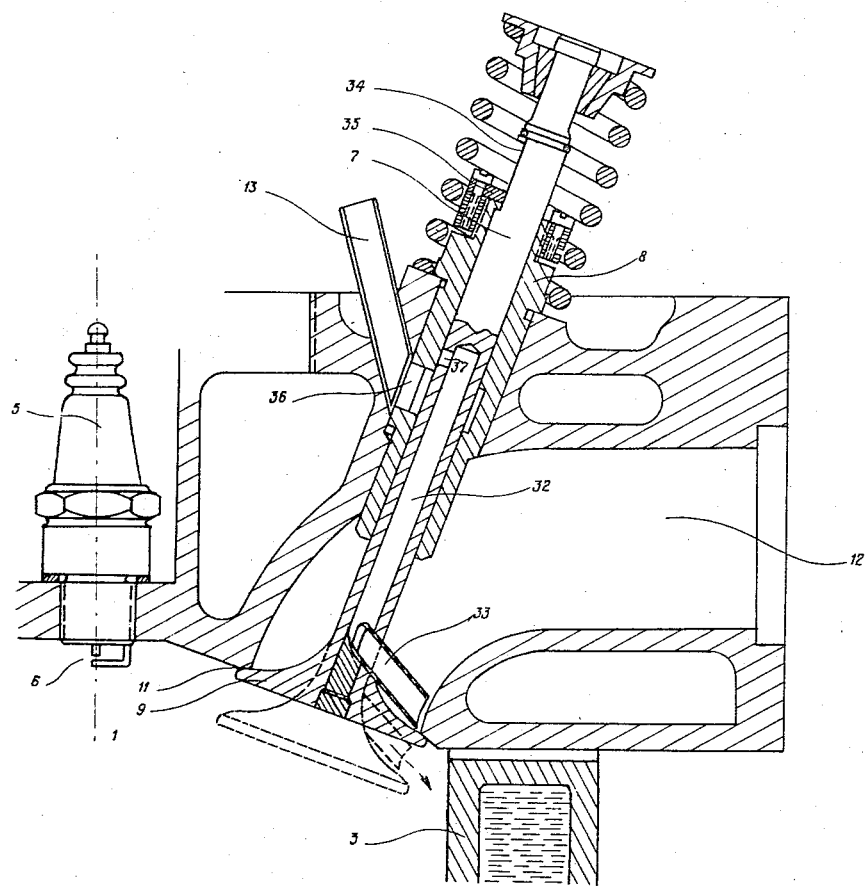
FIG. 5 is a second embodiment of a more perfected apparatus advantageously used in an engine having several cylinders.

FIG. 5 is another embodiment of apparatus which can be advantageously used in place of that of FIGS. 1 and 1a for carrying out the present invention with an engine having a plurality of cylinders.

The apparatus of FIG. 5, which is more perfected than those discussed above, prevents any communication between the sources of the two flows of gas when the intake valve is closed avoiding any possibility of aspiration of the rich mixture into the pipe for the lean mixture which aspiration would produce a certain homogeneity of the two gas flows.

In the apparatus of FIG. 5 a duct 32 is formed in shaft 7 of the intake valve substantially parallel to the axis of the shaft and is prolonged at head 9 of the valve by a second duct 33 making an angle with duct 32.

Pipe 13 and ducts 32 and 33 introduce the flow of lean mixture into the combustion chamber when the intake valve is in open position, as shown by broken line in FIG. 5, and duct 33 has an orientation such that admission occurs in a direction which separates the lean mixture from the electrode 6 of spark plug 5 and, for example, directs it against the wall of cylinder 3 (broken arrows) which deflects this flow toward the piston.

A blocking system for the orientation of the intake valve is employed to maintain the desired orientation of duct 33 and to prevent rotation of the valve around its axis so as to prevent turning of duct 33 toward electrodes 6 during the use of the engine. This blocking system is obtained by the cooperation of a flat 34 formed on the valve shaft 7 with a finger 35 fixed to valve guide 8. Any other blocking apparatus can be used for maintenance of the desired orientation.

The displacement of the valve is thus limited to movements of translation parallel to its axis.

Pipe 33 for the lean mixture opens through the base of valve guide 8 through opening 36 and conduit 32 in the valve shaft includes an opening 37 having a chosen location so that when the valve is in open position pipe 13 and conduits 32 and 33 will be in communication and permit the lean mixture to flow toward combustion chamber 1, communication being terminated when the intake valve is closed when valve head 9 rests on valve seat 11.

Thus in the closed position there is no communication between pipe 13 for the lean mixture and pipe 12 for admission of the rich mixture.

Changes in or modifications to the above-described illustrative embodiments of the present concept may now occur to those skilled in the art without departing from the present invention.

In particular, it would be possible to feed the lean mixture or air under light pressure by means of a compressor.

In the embodiment of FIG. 3, this compressor could be placed in duct 16 upstream or downstream of venturi 30.

If such a compressor is used, control of the amount of air introduced into chamber 1 by the pipe for admission of the lean mixture, when the intake valve is open, will be obtained by control of the angular position of valve 28 and by regulation of the conditions of operation of the compressor.

The compressor could be driven by the internal combustion engine itself or by an electric auxiliary motor. The operation of the compressor could be controlled for certain values of the load on the engine, for example, at certain positions of the valves 27 or 28.

Reference should therefore be had to the appended claims to determine the scope of this invention.

What we claim is:

1. A controlled ignition internal combustion engine having at least one cylinder and a single combustion chamber for said cylinder, an intake port for said combustion chamber, an intake valve for opening and closing said intake port, a first pipe opening into said combustion chamber through said intake port, a second pipe, a terminal pipe for said second pipe, said intake valve when open at the beginning of the intake cycle of the engine opening communication substantially simultaneously between said combustion chamber, said first pipe and said second pipe through said terminal pipe, means for supplying said first pipe with a first gas comprising a fuel-air mixture having a richness between 0.75 and 1.70, means for supplying a second gas to said second pipe comprising a fuel-air mixture having a richness between 0 and 0.75, separate control means for controlling the amounts of said two gases in said first and second pipes, a spark plug in said combustion chamber, electrodes for said spark plug and means for forming in a zone of said combustion chamber spaced from said electrodes a gaseous mixture having a richness less than the average richness in the remainder of said combustion chamber, said last named means including orientation of said terminal pipe toward a part of said combustion chamber outside of a sphere centered between said electrodes and passing through the center of said intake port, said intake port and said terminal pipe having dimensions such that a cross-section of said terminal pipe is less than 1/3 of the cross-section of said intake port.

2. An engine as described in claim 1, the ratio of the cross-section of said terminal pipe and the cross-section of said intake port being thus less than 1/5.

3. An engine as described in claim 1, the ratio of the cross-section of said terminal pipe and the cross-section of said intake port being about 1/10.

4. An engine as described in claim 1 including coupling means between the means for controlling the amounts of said first and second gases.

5. An engine as described in claim 4, wherein said means for controlling the amounts of said first and second gases are first and second butterfly valves and the coupling means include a shaft on which said valves are mounted parallel to each other, the diameter of said second pipe at said second butterfly valve being greater than the diameter of said terminal pipe.

6. An engine as described in claim 5, said second gas being air and the section of said first pipe at said first butterfly valve being greater than the section of said second pipe at said second butterfly valve.

7. An engine as described in claim 4, said means for controlling the amount of gas in said first and second pipes including first and second butterfly valves disposed respectively in said first pipe and in said second pipe, a first shaft for said first butterfly valve, a cam mounted on said first shaft, a second shaft for said second butterfly valve, a lever mounted on said second shaft, a cam follower on said lever engaging said cam, a first spring connected to said cam returning said first butterfly valve toward closed position, a second spring connected to said lever and urging said cam follower against said cam and second and third stops limiting rotation of said cam, one of said second and third stops being adjustable.

References Cited

UNITED STATES PATENTS

| | | | |
|---|---|---|---|
| 1,799,397 | 4/1931 | Taylor et al. | 123—127 |
| 2,968,297 | 1/1961 | Raven | 123—119 |
| 3,017,872 | 1/1962 | Candelise | 123—75 |
| 3,087,480 | 4/1963 | Baudry | 123—119 |
| 3,182,646 | 5/1965 | Kuechenmeister | 123—119 |
| 3,283,751 | 11/1966 | Goossak et al. | 123—32 |
| 3,318,292 | 5/1967 | Hideg | 123—119 X |
| 3,331,361 | 7/1967 | Baudry | 123—32 X |

AL LAWRENCE SMITH, *Primary Examiner.*